3,406,160
METAL COMPLEX TRISAZO DYES
Heinz Wicki, Allschwil, Basel-Land, Switzerland, assignor to Sandoz Ltd. (also known as Sandoz A.G.), Basel, Switzerland
No Drawing. Filed Apr. 15, 1965, Ser. No. 448,241
Claims priority, application Switzerland, Apr. 22, 1964, 5,225/64
8 Claims. (Cl. 260—145)

ABSTRACT OF THE DISCLOSURE

2:1 metal complexes of trisazo dyes containing a sulfonic acid group and a separate phenyl-azo-group bound to each of the 2-, 4- and 6-positions of a benzene nucleus having in each of its 1- and 3-positions either hydroxyl or amino substituents and characterized by a 2-hydroxy-3,5-dinitrophenylazo as one of the separate phenyl-azo-groups having good building-up properties and give consistent shades on leathers of different tannage.

---

This invention relates to azo dyes and their metal complex compounds and to mixtures of the aforesaid metal complex compounds and processes for the production thereof. In the metal-free form the dyes have the formula

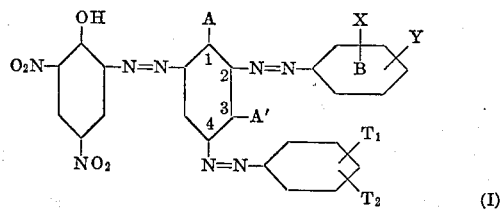

(I)

wherein A and A' each stands for an amino or a hydroxyl group, $T_1$ for hydrogen, chloro, bromo or nitro, $T_2$ for chloro, bromo or nitro, X for hydrogen, hydroxyl, halogen, nitro, the sulfonic acid groups, or substituted or unsubstituted low-molecular alkyl or alkoxy, Y for hydrogen, hydroxyl, chloro, bromo, nitro, substituted or unsubstituted alkyl or alkoxy, or the group

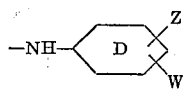

where W represents hydrogen or the sulfonic acid group and Z hydrogen, nitro, hydroxyl or substituted or unsubstituted low-molecular alkyl or alkoxy. The ring B or the ring D which may be present in the dye molecule contains a sulfonic acid group.

The process comprises coupling 1 mole of a diazo compound of an amine of formula

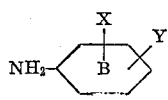

(II)

with 1 mole of a coupling component of formula

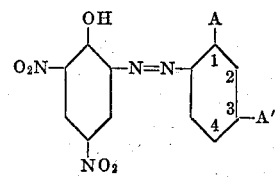

(III)

to form a disazo dye (IV) and reacting this dye with a diazo compound of an amine of formula

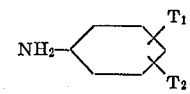

(V)

to form the final dye, which may then be treated with a metal-yielding agent so that a metal-containing trisazo dye is obtained.

Metal compounds specially suitable for the production of these metal complex compounds are those of chromium, copper, nickel, manganese, cobalt and iron.

Alternatively, metal-containing trisazo dyes of Formula I can be produced by coupling with a component of Formula III that contains metal, preferably copper, nickel, chromium, manganese, cobalt or iron.

Metallisation is effected to best advantage in aqueous medium, if necessary with the addition of an organic solvent, or in an organic solvent without other additions.

It is advantageous to metallise in such a way that an amount of metal-yielding agent containing less than two but at least one equivalent of metal acts upon two equivalents of the azo compound. Preferably 2:1 dye-metal complexes are produced. In the metallisation of heterogeneous dyes at least two different azo compounds of Formula I or in the metallisation of homogeneous dyes two identical compounds of Formula I can be reacted. Thus either homogeneous (symmetrical) or heterogeneous (asymmetrical) 2:1-dye-metal complexes can be produced as desired. It is of advantage to metallise in acid medium, although a neutral or alkaline medium can be used if preferred.

The following are enumerated as examples of metal compounds suitable for use in the process. Copper: cupric sulphate, cupric formate, cupric acetate, cupric chloride; nickel: nickel formate, nickel acetate, nickel sulphate; chromium: chromium trioxide, chromium fluoride, chromic sulphate, chromic formate, chromic acetate, chromic potassium sulphate, chromic ammonium sulphate, sodium chromate and bichromate, potassium chromate and bichromate; manganese: manganese formate, acetate and sulphate; cobalt: cobalt formate, acetate and sulphate; iron: iron formate, acetate and sulphate.

Substituted or unsubstituted low-molecular alkyl or alkoxy is in each instance preferably a radical having 1, 2 or 3 carbon atoms, e.g. methyl, ethyl, propyl, isopropyl, methoxy, ethoxy, cyanethyl, hydroxyethyl, chloromethyl or chlorethyl radicals.

The dyes of Formula I can be obtained by coupling 1 mole of a coupling component of Formula III, metallisable if metal-containing dyes are desired, with 1 mole of a diazo compound of an amine of Formula II in alkaline medium at pH 7.5 to 12 or preferably 8–9. This reaction yields the disazo dye (IV) which is reacted with a diazo compound of an amine of Formula V in said medium at pH 3 to 7, or preferably 4.5–5.5 to the trisazo dye of Formula I.

A preferred mode of operation of the process consists in reacting, either simultaneously or successively, a mixture of 0.2–0.8 mole, or preferably 0.5 mole, of a diazo compound and 0.8–0.2 mole, or preferably 0.5 mole, of a second diazo compound different from the first, both derived from amines of Formula II, with 1 mole of a coupling component of Formula III, which may be metal-containing if desired, to give a heterogeneous disazo dye (IVa) which is reacted with a diazo compound obtained with an amine of Formula V to give the final dye.

The dyes obtained by the process of this application, metal-free or metal-containing as the case may be, are suitable for dyeing and printing leather. Mixtures of several of these dyes can also be used for this purpose.

The dyes have good building-up properties in a neutral or weakly acid medium and very good level dyeing properties, and give consistent shades on leathers of different tannage. They have very good fastness to light, water, washing, pressing, perspiration and formaldehyde, good buffing fastness on chrome suede leather and good resistance to migration in polyvinyl chloride and crepe rubber. They build up to heavy depths on leathers of low affinity, e.g. chrome-vegetable and chrome-synthetic tanned skins, possessing this high affinity even when applied from neutral baths.

In the following examples the parts are by weight and the temperatures in degrees centigrade.

EXAMPLE 1

199 parts (1 mole) of 1-amino-2-hydroxy-3,5-dinitrobenzene are diazotised and the diazo compound coupled with 110 parts (1 mole) of 1,3-dihydroxybenzene in alkaline solution. The monoazo dye formed is coupled with 264 parts (1 mole) of the diazotised compound 4-amino-2-sulfodiphenylamine in alkaline solution. On completion of coupling the solution of the disazo dye formed is adjusted to pH 5.5 with hydrochloric acid, after which sodium acetate is added, followed by the diazo compound of 138 parts (1 mole) of 1-amino-4-nitrobenzene so that coupling reaction takes place at a pH of about 5. When the reaction has run its course the trisazo dye is precipitated by the addition of common salt and isolated by filtration. On drying it is obtained as a dark brown powder which dyes leather in dark red-brown shades.

EXAMPLE 2

One mole of the trisazo dye produced as described in Example 1 is dissolved in water and treated with 144 parts (0.5 mole) of crystallised ferric sulphate for 1 hour at 98° and about pH 5.5 The homogeneous, metallised 2:1 complex dye thus formed is precipitated with common salt and dried. It is a dark brown powder which dyes leather in dark brown shades. A chromium or cobalt complex dye of the same good quality can be obtained by treating the dye of Example 1 with chromium or cobalt sulphate.

EXAMPLE 3

The monoazo dye of Example 1, formed with 1-amino-2-hydroxy-3,5-dinitrobenzene and 1,3-dihydroxybenzene, is precipitated from its solution at pH 7 by the addition of common salt, filtered off and dissolved in a 2:1 mixture of water and formamide. The solution is treated with 140 parts (0.5 mole) of crystallised cobalt sulphate for 1 hour at 100°, the metal complex dye thus formed precipitated with common salt, dissolved in water, and coupled with the diazo compound of 174 parts (1 mole) of 1-amino-benzene-4-sulfonic acid in alkaline solution. On completion of coupling the pH of the coupling solution is adjusted to 6, sodium acetate is added and the disazo dye coupled at pH 5 with the diazo compound of 138 parts (1 mole) of 1-amino-3-nitrobenzene. On precipitation with common salt and drying, the metallised trisazo dye is obtained as a dark brown powder which dyes leather in red-brown shades.

EXAMPLE 4

The monoazo dye produced with 1-amino-2-hydroxy-3,5-dinitrobenzene and 1,3-dihydroxybenzene as described in Example 1 (1 mole) is coupled successively twice in alkaline solution, firstly with the diazo compound of 132 parts (0.5 mole) of 4-amino-2-sulphodiphenylamine and secondly with the diazo compound of 87 parts (0.5 mole) of 1-aminobenzene-2-sulfonic acid. Both diazo compounds may also be coupled simultaneously. The solution of this heterogeneous disazo dye mixture is buffered with hydrochloric acid and sodium acetate so that the next coupling reaction can take place at pH 4.5–5. The diazo compound of 138 parts (1 mole) of 1-amino-2-nitrobenzene is coupled with the heterogeneous disazo dye, the heterogeneous trisazo dye formed is treated with 144 parts of ferric sulphate for 1 hour at 98° and pH 5.5, and finally precipitated with common salt, isolated and dried. It is now a heterogeneous 2:1 iron complex dye in which 2 equivalents of the azo compound are in complex combination with 1 equivalent of iron, the two non-identical azo compounds having been employed in the ratio 1:1. Dyes of comparable quality are obtained when cobalt or chromium sulphate is used. On leather the dye gives dark yellowish brown dyeings.

EXAMPLE 5

Dyes with similar properties to the aforedescribed can be obtained when the metal-free trisazo dyes used in Example 4 are mixed in any desired porportions and the mixture treated with metal-yielding compounds as described in Example 4, using, e.g., 0.2–0.8 mole of one diazo compound and 0.8–0.2 mole of a second diazo compound different from the first.

Further dyes which can be obtained by the procedures described in Examples 1 to 5 are set forth in Table I. In the metal-free form they have the formula

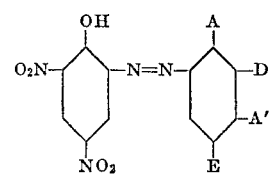

wherein A, A', D and E represent components, the formulae of which are given in the appropriate columns, which are suitable for the formation of dyes of Formula I. The next columns give the shades of the dyeings on leather obtained with the dye in its metal-free and its copper-, chromium-, cobalt- and iron-containing forms respectively.

| Ex. No. | A | A' | D | E | Shade of dyeings on leather obtained with the metal-free and metal-containing forms | | | | |
|---|---|---|---|---|---|---|---|---|---|
| | | | | | Metal-free | Copper | Cobalt | Chromium | Iron |
| 6 | OH | OH | H₂N—⌬—NO₂ | H₂N—⌬—NO₂ | Red-brown | Red-brown | Red-brown | Red-brown | Red-brown |
| 7 | NH₂ | NH₂ | H₂N—⌬(SO₃H)— | ⌬—NO₂ (NO₂) | do | do | do | do | Do. |
| 8 | NH₂ | NH₂ | H₂N—⌬—SO₃H | H₂N—⌬—NO₂ (NO₂) | do | do | do | do | Do. |
| 9 | OH | NH₂ | H₂N—⌬(CH₃)—SO₃H | H₂N—⌬—Cl | do | do | do | do | Do. |
| 10 | OH | OH | H₂N—⌬(CH₃)—SO₃H | H₂N—⌬—NO₂ (Cl) | do | do | do | do | Do. |
| 11 | OH | OH | H₂N—⌬(CH₃)—SO₃H | H₂N—⌬—NO₂ | do | do | do | do | Do. |
| 12 | OH | OH | H₂N—⌬(SO₃H)—NO₂ | H₂N—⌬—NO₂ | do | do | do | do | Do. |
| 13 | OH | OH | H₂N—⌬(OCH₃)—SO₃H | H₂N—⌬—NO₂ | do | do | do | do | Do. |
| 14 | OH | OH | H₂N—⌬(SO₃H)—CH₃ | H₂N—⌬—NO₂ | do | do | do | do | Do. |
| 15 | OH | OH | H₂N—⌬—NH—⌬(SO₃H)—NO₂ | H₂N—⌬—NO₂ | do | do | Violet-brown | Violet-brown | Dark-brown. |

| Ex. No. | A | A' | D | E | Shade of dyeings on leather obtained with the metal-free and metal-containing forms | | | | | |
|---|---|---|---|---|---|---|---|---|---|---|
| | | | | | Metal-free | Copper | Cobalt | Chromium | Iron |
| 16 | OH | OH | 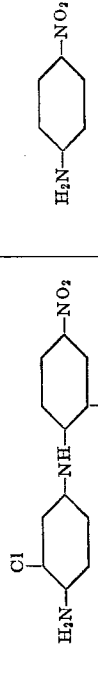 | 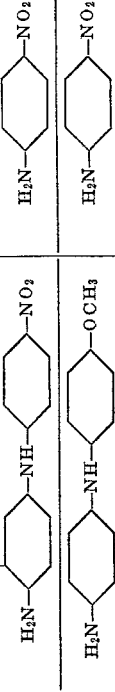 | do | do | do | do | Do. |
| 17 | OH | OH | 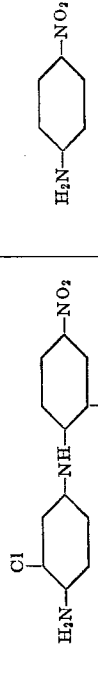 | 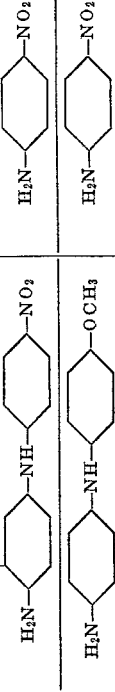 | do | do | do | do | Do. |
| 18 | OH | OH | 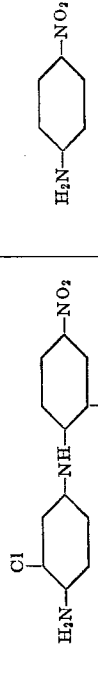 | 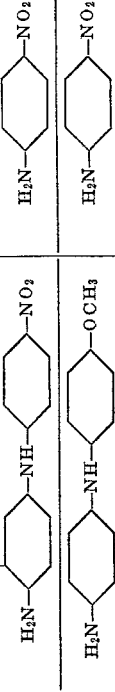 | do | do | do | do | Do. |
| 19 | OH | OH | 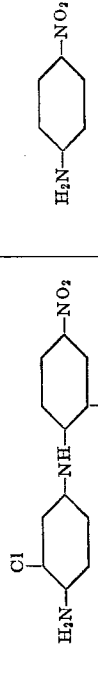 | 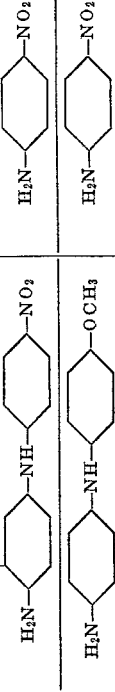 | do | do | do | do | Do. |
| 20 | OH | OH | 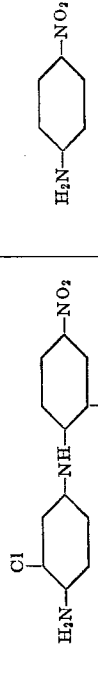 | 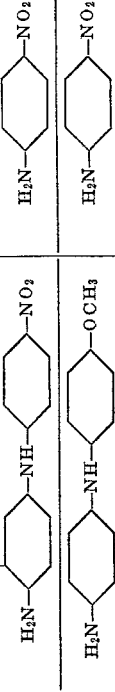 | do | do | do | do | Do. |
| 21 | NH₂ | OH | 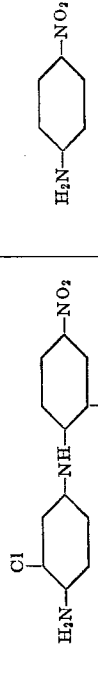 | 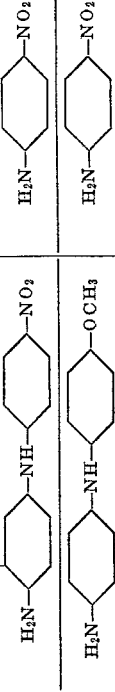 | do | do | do | do | Do. |
| 22 | OH | OH | 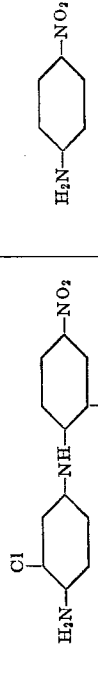 | 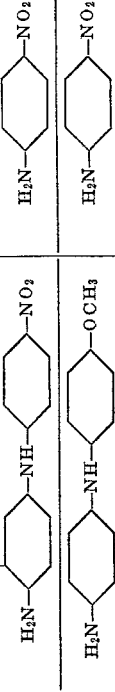 | do | do | do | do | Do. |
| 23 | OH | OH | 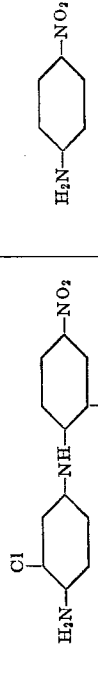 | 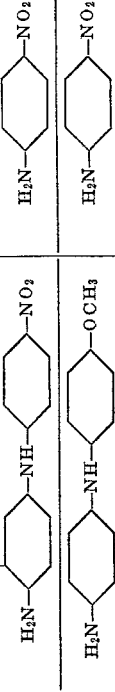 | do | do | do | do | Do. |
| 24 | OH | OH | 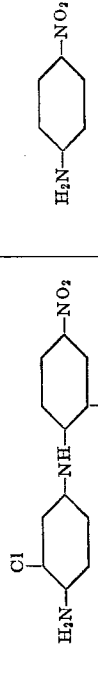 | 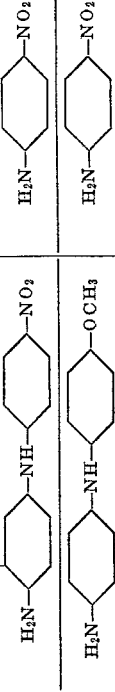 | do | do | do | do | Do. |

| Ex. No. | A | A' | D | E | Shade of dyeings on leather obtained with the metal-free and metal-containing forms | | | | |
|---|---|---|---|---|---|---|---|---|---|
| | | | | | Metal-free | Copper | Cobalt | Chromium | Iron |
| 25 | OH | OH | H₂N–C₆H₃(Br)(SO₃H) | H₂N–C₆H₄–NO₂ | do | do | do | do | Do. |
| 26 | OH | OH | H₂N–C₆H₄–SO₃H–NH–C₆H₅ | H₂N–C₆H₄–NO₂ | do | do | do | do | Do. |
| 27 | OH | OH | H₂N–C₆H₃(C₂H₅)–S–C₆H₄–SO₃H | H₂N–C₆H₄–NO₂ | do | do | do | do | Do. |
| 28 | OH | OH | H₂N–C₆H₃(SO₃H)–OC₂H₅ | H₂N–C₆H₄–NO₂ | do | do | do | do | Do. |
| 29 | OH | OH | H₂N–C₆H₃(SO₃H)–NH–C₆H₃(NO₂)(CH₃) | H₂N–C₆H₄–NO₂ | do | do | do | do | Do. |
| 30 | OH | OH | H₂N–C₆H₃(NO₂)–NH–C₆H₄–SO₃H | H₂N–C₆H₄–NO₂ | do | do | do | do | Do. |
| 31 | OH | OH | H₂N–C₆H₄–SO₃H | H₂N–C₆H₄–NO₂ | do | do | do | do | Do. |

Dyeing Example A

A dyebath of 250 parts of water at 65° and 1 part of the dye of Example 2 is prepared in a drum dyeing machine, and 100 parts of freshly tanned, neutralised chrome grain leather are dyed in it for 30 minutes. 2 parts of an anionic fatliquor on a sulphonated train oil basis are added, drumming is continued for 30 minutes, and the leather then removed, dried and finished. A very level dark brown dyeing is obtained.

Dyeing Example B 100 parts of calf suede leather are wetted back in the drum for 4 hours in a bath of 1000 parts of water and 2 parts of ammonia. The leather is then drum dyed for 1½ hours in a fresh bath set with 500 parts of water at 65°, 2 parts of ammonia and 10 parts of the dye of Example 2 in aqueous solution. To exhaust the bath 4 parts of 85% formic acid are added slowly, after which drumming is continued until the dyeing is fixed. The leather is rinsed, dried and finished. After the nap has been rebuffed a suede leather dyed in a very level dark brown shade is obtained.

Dyeing Example C 100 parts of lambskin with a chrome-vegetable tannage are drum dyed for 45 minutes in a bath of 1000 parts of water at 55°, 10 parts of the dye produced as described in Example 3 and 1.5 parts of an anionic sperm oil emulsion. hTe dyeing is fixed by the gradual addition over 30 minutes of 5 parts of 85% formic acid, and the leather subsequently dried and finished. The lambskin is dyed in a level dark brown shade.

Dyeing Example D

A solution of 20 parts of the dye of Example 4 in 847 parts of water, 150 parts of ethyl glycol and 3 parts of 85% formic acid is applied to the grain side of combination tanned chrome leather with corrected grain. The leather is dried at a moderate temperature and finished. The dark yellowish brown dyeing obtained has good fastness properties.

Formulae of representative dyes of the foregoing examples are as follows:

EXAMPLE 2A

The homogeneous 2:1 iron complex compound of the trisazo dye of the formula

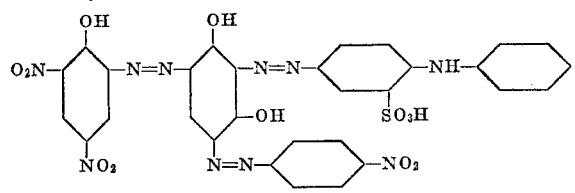

EXAMPLE 2B

The homogeneous 2:1 chromium complex compound of the trisazo dye corresponding to the formula in Example 2A.

EXAMPLE 2C

The homogeneous 2:1 cobalt complex compound of the trisazo dye corresponding to the formula of Example 2A.

EXAMPLE 4A

The heterogeneous 2:1 iron mixed complex compound of the trisazo dyes of the formulae

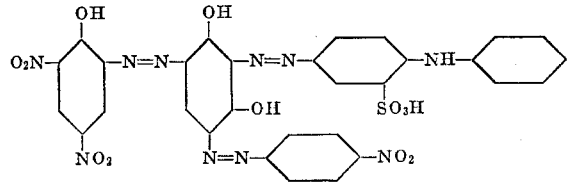

and

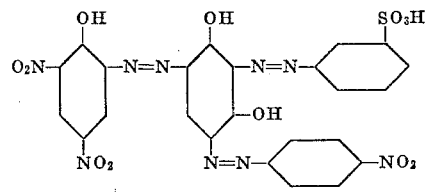

EXAMPLE 4B

The heterogeneous 2:1 chromium mixed complex compound of the trisazo dyes corresponding to the formulae in Example 4A.

EXAMPLE 4C

The heterogeneous 2:1 cobalt mixed complex compound of the trisazo dyes corresponding to the formulae in Example 4A.

EXAMPLE 6A

The homogeneous 2:1 iron complex compound of the trisazo dye of the formula

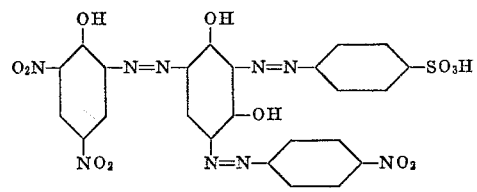

EXAMPLE 6B

The homogeneous 2:1 chromium complex compound of the trisazo dye corresponding to the formula in Example 6A.

EXAMPLE 6C

The homogeneous 2:1 cobalt complex of the trisazo dye corresponding to the formula in Example 6A.

EXAMPLE 11A

The homogeneous 2:1 iron complex compound of the trisazo dye of the formula

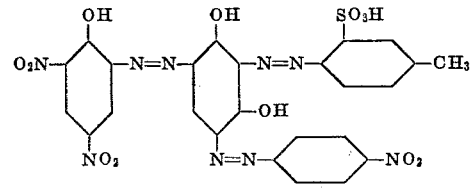

EXAMPLE 11B

The homogeneous 2:1 chromium complex compound of the trisazo dye corresponding to the formula in Example 11A.

EXAMPLE 11C

The homogeneous 2:1 cobalt complex compound of the trisazo dye corresponding to the formula in Example 11A.

EXAMPLE 30A

The homogeneous 2:1 iron complex compound of the trisazo dye of the formula

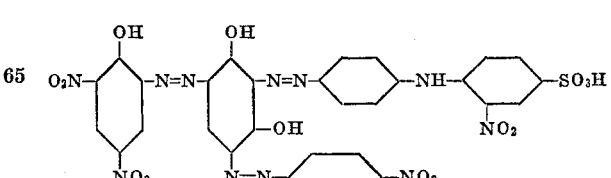

EXAMPLE 30B

The homogeneous 2:1 chromium complex compound of the trisazo dye corresponding to the formula in Example 30A.

EXAMPLE 30C
The homogeneous 2:1 cobalt complex compound of the trisazo dye corresponding to the formula in Example 30A.

EXAMPLE 31A
The homogeneous 2:1 iron complex compound of the trisazo dye of the formula

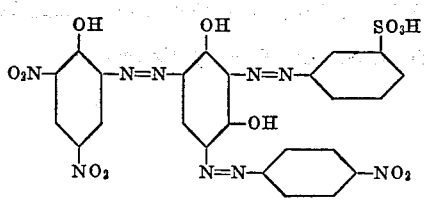

EXAMPLE 31B
The homogeneous 2:1 chromium complex compound of the trisazo dye corresponding to the formula in Example 31A.

EXAMPLE 31C
The homogeneous 2:1 cobalt complex compound of the trisazo dye corresponding to the formula in Example 31A.

Having thus disclosed the invention what I claim is:

1. A member selected from the group consisting of 2:1-homogeneous and 2:1-heterogeneous mixed metal complex compounds which in the metal-free form have the formula

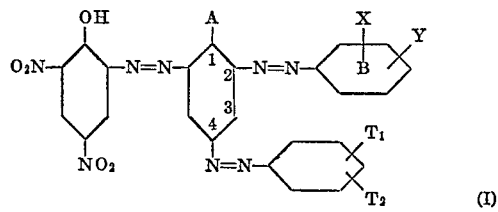

wherein
A and A' each stands for a member selected from the group consisting of an amino and a hydroxyl group,
$T_1$ represents a member selected from the group consisting of hydrogen, chloro, bromo and nitro,
$T_2$ represents a member selected from the group consisting of chloro, bromo and nitro,
X represents a member selected from the group consisting of hydrogen, hydroxyl, chloro, bromo, nitro, the sulfonic acid group, substituted and unsubstituted low-molecular alkyl and alkoxy, any substituent being a member selected from the group consisting of cyano, chloro and hydroxyl,
Y represents a member selected from the group consisting of hydrogen, hydroxyl, chloro, bromo, nitro, methyl, ethyl, propyl, iso-propyl, methoxy, ethoxy, cyanethyl, hydroxy-ethyl, chloromethyl and chloroethyl and the group

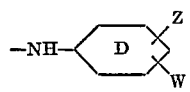

wherein W represents a member selected from the group consisting of hydrogen and the sulfonic acid group and Z represents a member selected from the group consisting of hydrogen, nitro, hydroxy, substituted and unsubstituted low-molecular alkyl and alkoxy, any substitutent being a member selected from the group consisting of cyano, chloro and hydroxyl, and one of the rings B and D contains a sulfonic acid group.

2. A metal complex compound according to claim 1 wherein the metal is a member selected from the group consisting of copper, nickel, chromium, manganese, cobalt and iron.

3. A member selected from the group consisting of the homogeneous 2:1-iron-, 2:1-chromium- and 2:1-cobalt complex compound of the trisazo dye of the formula

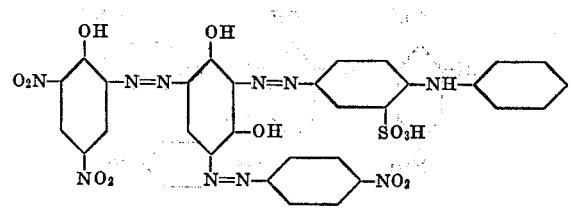

4. A member selected from the group consisting of the heterogeneous 2:1-iron-, 2:1-chromium- and 2:1-cobalt mixed complex compound of the trisazo dyes of the formulae

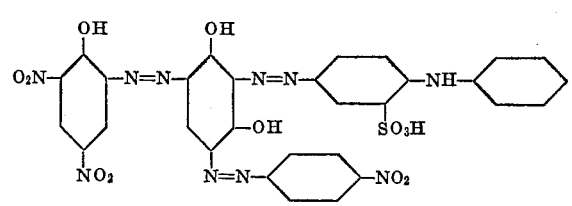

and

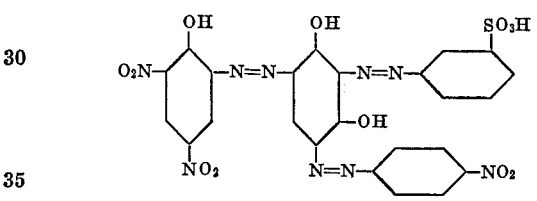

5. A member selected from the group consisting of the homogeneous 2:1-iron-, 2:1-chromium- and 2:1-cobalt complex compound of the trisazo dye of the formula

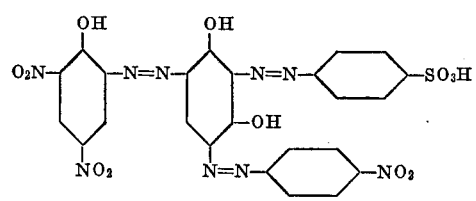

6. A member selected from the group consitsing of the homogeneous 2:1-iron-, 2:1-chromium- and 2:1-cobalt complex compound of the trisazo dye of the formula

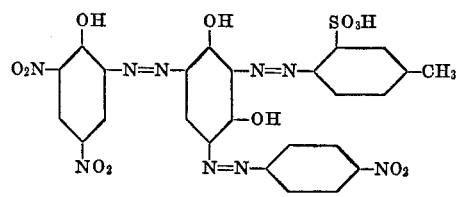

7. A member selected from the group consisting of the homogeneous 2:1-iron-, 2:1-chromium- and 2:1-cobalt complex compound of the trisazo dye of the formula

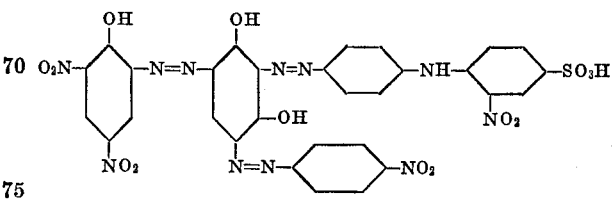

8. A member selected from the group consisting of the homogeneous 2:1-iron-, 2:1-chromium- and 2:1-cobalt complex compound of the trisazo dye of the formula
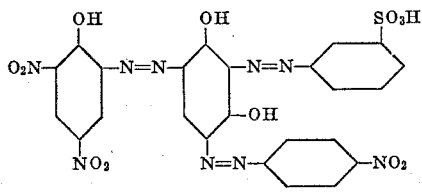
References Cited
UNITED STATES PATENTS
| | | | |
|---|---|---|---|
| 2,045,090 | 6/1936 | Lang et al. | 260—145 |
| 2,111,559 | 3/1938 | Fellmer | 260—145 |
| 2,175,187 | 10/1939 | Fellmer | 260—145 |
| 2,183,673 | 12/1939 | Dobler et al. | 260—145 |
| 2,220,397 | 11/1940 | Crossley et al. | 260—145 |
FLOYD D. HIGEL, *Primary Examiner.*

PO-1050
(5/69)

UNITED STATES PATENT OFFICE
CERTIFICATE OF CORRECTION

Patent No. 3,406,162            Dated October 15, 1968

Inventor(s) Reinhard Neier

It is certified that error appears in the above-identified patent and that said Letters Patent are hereby corrected as shown below:

Column 3, line 64, "pyridine" should read --, pyridine,--. Column 4, line 15, "dihydroabiethylamine" should read --dihydroabietylamine--; line 40, in the formula, "N($C_2H_5$)$_2$-" should read --($C_2H_5$)$_2$N- --; line 62, "alcohol" should read --alcohol,2-.? Column 5, Example 23, line 3, "acid" should read --acid---; Example 26, line 3, "acetoacetoacetyl" should read --acetoacetyl--. Column 8, line 50, in the formula of Example 1, "→CO" should read -- → Co---;

in the formula of Example 15, in the middle of the left portion of the formula, "→OO←" should read --→ Co← --;

in the same formula, right portion, "($C_2H_5$)$_2$N=" should read --($C_2H_5$)$_2$N- --.

Column 11, line 2, "dye organic" should read --dye/organic--; line 22, in the formula of claim 4 "R =" should read --$R_1$- --. Column 15, in the left portion of the formula of claim 20,

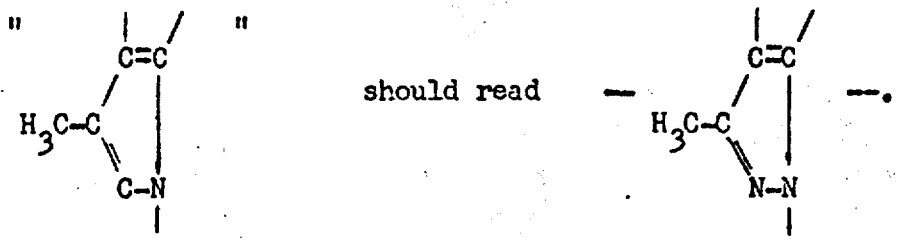

SIGNED AND
SEALED

APR 7 1970

(SEAL)
Attest:

Edward M. Fletcher, Jr.
Attesting Officer

WILLIAM E. SCHUYLER, JR.
Commissioner of Patents